United States Patent
Suzuki et al.

(10) Patent No.: US 6,448,998 B1
(45) Date of Patent: Sep. 10, 2002

(54) SCANNING AND IMAGING LENS, OPTICAL SCANNING DEVICE AND IMAGE FORMING APPARATUS

(75) Inventors: Seizo Suzuki; Magane Aoki; Hiromichi Atsuumi, all of Kanagawa; Kohji Sakai, Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

(21) Appl. No.: 09/649,179

(22) Filed: Aug. 29, 2000

(30) Foreign Application Priority Data

Aug. 31, 1999 (JP) .............................. 11-246805
Dec. 28, 1999 (JP) .............................. 11-373276

(51) Int. Cl.⁷ ............................... B41J 27/00
(52) U.S. Cl. ....................... 347/258; 347/244
(58) Field of Search ................ 347/241, 243, 347/244, 256, 259, 258, 134; 359/204, 205, 206

(56) References Cited

U.S. PATENT DOCUMENTS 4,934,772 A * 6/1990 Sakuma et al. ............. 359/206
5,652,670 A * 7/1997 Hayashi ...................... 359/205

* cited by examiner

*Primary Examiner*—Hai Pham
(74) *Attorney, Agent, or Firm*—Oblon, Spivak, McClelland, Maier & Neustadt, P.C.

(57) ABSTRACT

A scanning and imaging lens condensing a light flux deflected by a deflector onto a surface to be scanned as a beam spot, has a plurality of lenses. A shape in main scanning cross section of each of both surfaces of a lens on a side of deflector has a convex shape, and a shape in main scanning cross section of at least one surface of the lens on the side of deflector is a non-arc shape. A shape in main scanning cross section of a first surface of a lens on a side of surface to be scanned has a convex shape, and a shape in main scanning cross section of at least one surface of the lens on the side of surface to be scanned is a non-arc shape. The scanning and imaging lens has at least two special toroidal surfaces in each of which a curvature in sub-scanning cross section varies in main scanning direction.

31 Claims, 8 Drawing Sheets

CURVATURE OF FIELD

SUB-SCANNING DIRECTION ———
MAIN SCANNING DIRECTION - - - - - -

LINEARITY, f θ CHARACTERISTIC

LINEARITY ———
f θ CHARACTERISTIC - - - - - -

Y=170.0

SUB-SCANNING DIRECTION ———

MAIN SCANNING DIRECTION --------

CURVATURE OF FIELD

Y=170.0

LINEARITY ——— f θ CHARACTERISTIC --------

LINEARITY, f θ CHARACTERISTIC

MAIN SCANNING DIRECTION

SUB-SCANNING DIRECTION

MAIN SCANNING DIRECTION

SUB-SCANNING DIRECTION

Y=150.0

-2.00   2.00
        (mm)

SUB-SCANNING ———
DIRECTION

MAIN SCANNING ------
DIRECTION

CURVATURE OF FIELD

Y=150.0

-1.00   1.00
        (%)

LINEARITY ——— fθ ------
CHARACTERISTIC

LINEARITY, fθ CHARACTERISTIC

SCANNING AND IMAGING LENS, OPTICAL SCANNING DEVICE AND IMAGE FORMING APPARATUS

BACKGROUND OF THE INVENTION

1. Field of the Invention

The present invention generally relates to a scanning and imaging lens, an optical scanning device and an image forming apparatus.

2. Description of the Related Art

Optical scanning devices are widely used in 'image forming apparatus' such as a digital copier, an optical printer, an optical plate-making machine, a facsimile machine and so forth. A writing density of optical scanning devices has been increased to 1200 dpi, 1600 dpi, and is intended to be increased, further higher.

In order to achieve such high-density writing, it is necessary to form a beam spot having a small diameter, and, also, quality and stability of a beam spot is needed to be improved. Stability of a beam spot is determined from determining whether or not 'a variation in beam-spot diameter on a surface to be scanned due to a variation in image height' is very small and stable. Quality of a beam spot is determined from determining whether or not 'the light-intensity distribution of the beam spot has a simple mountain shape and does not have a complicated lower slope shape'.

In order to achieve a beam spot having high-quality and stability, it is necessary for a scanning and imaging optical system of an optical scanning device to have a high performance for forming a beam spot on a surface to be scanned using a deflected light flux. A factor causing a beam-spot diameter to fluctuate is, as is well known, 'curvature of field in a scanning and imaging optical system', and many scanning and imaging optical systems in which curvature of field is well corrected have been proposed. Further, it is important for an optical magnification in a scanning and imaging optical system to be fixed when an image height of a beam spot changes.

However, in order to form a beam spot having stability and high quality, not only it is necessary to correct a geometrical optical performance such as curvature of field and an optical magnification but also it is important to 'set a wave-optical wavefront aberration to be fixed between respective image heights'.

SUMMARY OF THE INVENTION

An object of the present invention is to achieve high-density, satisfactory optical scanning with a stable and high-quality beam spot, by well correcting not only curvature of field and optical magnification but also 'wavefront aberration on pupil' in a scanning and imaging optical system.

A scanning and imaging lens according to the present invention is a 'scanning and imaging lens which condenses a light flux deflected by a deflector onto a surface to be scanned as a beam spot'.

In the following description, for each of particular lenses constituting the scanning and imaging lens, a surface on the incidence side (surface on the side of deflector) is referred to as a first surface, and a surface on the exit side (surface on the side of surface to be scanned) is referred to as a second surface. However, when lens surfaces of the scanning and imaging lens are referred to in series from the side of deflector to the side of surface to be scanned in surface number, they will be expressed as 'first surface, second surface, third surface, . . . '.

A scanning and imaging lens according to a first aspect of the present invention has the following features:

The scanning and imaging lens comprises 'a plurality of lenses'.

These lenses have 'shapes in main scanning cross section (imaginary plane cross section including an optical axis of a lens and in parallel to main scanning direction) such that a lens on the side of deflector (lens nearest to the deflector when the scanning and imaging lens comprises more than two lenses) has a convex shape in main scanning cross section in each of both surfaces, and has 'at least one surface' having a non-arc shape in main scanning cross section, and a lens on the side of surface to be scanned (lens nearest to the surface to be scanned when the scanning and imaging lens comprises more than two lenses) has a convex shape in main scanning cross section in the first surface, and has 'at least one surface' having a non-arc shape in main scanning cross section.

Further, the scanning and imaging lens has 'at least two special toroidal surfaces'.

The 'special toroidal surface' is a toroidal surface such that a curvature in sub-scanning cross section (imaginary plane cross section perpendicular to main scanning direction) varies in main scanning direction.

As will be described, there are lenses included in a scanning and imaging lens according to the present invention having a 'surface shape not having a symmetry axis'. Therefore, an optical axis of a lens in the specification and claims denotes a reference axis in direction corresponding to an ordinary optical axis in an analytic expression determining the lens surface.

The scanning and imaging lens according to the first aspect of the present invention preferably has a lateral magnification βo in sub-scanning direction on a light path from the origin of deflection by the deflector to the surface to be scanned when a chief ray passes through a point on the surface to be scanned at which an image height is 0 satisfying the following condition:

$$0.5 < |\beta o| < 1.5 \quad (1)$$

Further, the scanning and imaging lens preferably has the above-mentioned lateral magnification βo and a lateral magnification βh in sub-scanning direction when a chief ray passes through the surface to be scanned at which an image height is an arbitrary amount satisfying the following conditon:

$$0.9 < |\beta h/\beta o| < 1.1 \quad (2)$$

Further, 'at least one surface of the special toroidal surfaces' in the scanning and imaging lens may have a non-arc shape in main scanning cross section, and, also, a non-arc shape in sub-scanning cross section, wherein the non-arc shape in sub-scanning cross section may vary according to a coordinate Y in main scanning direction, and the non-arc shape in sub-scanning cross section in each coordinate Y may be determined so as to correct wavefront aberration on the surface to be scanned, and wherein at least one surface of the special toroidal surfaces may be such that 'a curvature in sub-scanning cross section varies asymmetrically with respect to the optical axis in main scanning direction'.

Further, the scanning and imaging lens may comprise two single lenses L1 and L2 disposed from the side of deflector to the side of surface to be scanned.

Each of the lenses L1 and L2 of the scanning and imaging lens may have a 'meniscus shape such that the side of deflector is concave and the side of surface to be scanned is convex' in sub-scanning cross section on the optical axis and in the proximity thereof.

Each of the lenses L1 and L2 preferably has a positive power in main scanning cross section, and a radius Rm2 of curvature of the second surface of the lens L1 on the optical axis in main scanning cross section and a radius Rm3 of curvature of the first surface of the lens L2 on the optical axis in main scanning cross section preferably satisfy the following condition:

$$0.1 < |Rm2/Rm3| < 0.5 \quad (3)$$

Further, a radius Rs2 of curvature of the second surface of the lens L1 on the optical axis in sub-scanning cross section and a radius Rs4 of curvature of the second surface of the lens L2 on the optical axis in sub-scanning cross section preferably satisfy the following condition:

$$0.05 < |Rs4/Rs2| < 0.5 \quad (4)$$

The scanning and imaging lens may have at least two special toroidal surfaces in each of which 'a curvature in sub-scanning cross section varies asymmetrically with respect to the optical axis in main scanning direction', and each of the lenses L1 and L2 may have 'at least one of these special toroidal surfaces'.

An optical scanning device according to the present invention is an 'optical scanning device deflecting a light flux from a light source by a deflector, condensing the deflected light flux onto a surface to be scanned as a beam spot by a scanning and imaging lens, and, thus, scanning the surface to be canned by the beam spot'.

Any of the above-described scanning and imaging lenses according to the first aspect of the present invention may be used as the scanning and imaging lens of the optical scanning device according to the present invention.

As the above-mentioned deflector, 'one having a deflection reflective surface' such as rotational polygon mirror, rotational bi-surface mirror, rotational mono-surface mirror, or the like may be used. In this case, the light flux from the light source forms on or in the proximity of the deflection reflective surface a 'line image long in main scanning direction' by a 'line-image forming optical system' such as a cylindrical lens, cylindrical concave mirror, or the like. Thereby, it is possible to correct 'inclination of surface' of the deflector.

As the light source, a semiconductor laser may be preferably used. A light flux emitted by the light source may be transformed into a 'substantially parallel light flux' by a coupling lens. It is possible to transform the light flux obtained from coupling performed by the coupling lens into a 'divergent light flux or convergent light flux'.

In the optical scanning device, a spot diameter according to LSF (Line Spread Function) of $1/e^2$ intensity of a beam spot condensed onto the surface to be scanned may be set to equal to or smaller than 50 μm in each of main and sub-scanning directions.

That is, in a position of image height of the beam spot on the surface to be scanned, a coordinate η is set in main scanning direction and a coordinate ζ is set in sub-scanning direction, an intensity distribution F(ζ, η) of the beam spot approximated as a two-dimensional Gaussian distribution is integrated so that P(ζ)=∫F(ζ, η)dη is obtained. Then, 'the width of the range of ζ' through which P(ζ) is equal to or larger than $1/e^2$ after the maximum of P(ζ) is normalized into 1 is regarded as the spot diameter in sub-scanning direction. With regard to main scanning direction, the same manner is applied.

An image forming apparatus according to the present invention is an 'image forming apparatus forming an electrostatic latent image on a latent-image carrying body through optical scanning, visualizing the formed electrostatic latent image, and obtaining a desired recorded image'.

Any of the above-described optical scanning devices may be used as an optical scanning device performing the optical scanning of the latent-image carrying body of the image forming apparatus according to the present invention.

In this case, a photoconductive photosensitive body may be used as the latent-image carrying body, the electrostatic latent image may be formed thereon through uniform charging and the optical scanning thereof, and the thus-formed electrostatic latent image may be visualized as a toner image. The toner image is fixed onto a sheet-like recording medium (transfer paper, plastic sheet for an overhead projector, or the like).

In the image forming apparatus, a film for photography with silver halide may be used as the image carrying body, for example. In this case, the electrostatic latent image formed through the optical scanning by the optical scanning device is visualized by a 'method of developing in an ordinary process of photography with silver halide'. Such an image forming apparatus may be embodied as an 'optical plate-making system', a 'medical image forming apparatus' in which a result of CT scan or the like is output to a film for photography with silver halide, or the like.

The image forming apparatus according to the present invention may also be embodied as a laser printer, a laser plotter, a digital copier, a facsimile machine, or the like.

For obtaining a small-diameter, satisfactory and stable beam spot, a scanning and imaging lens needs to satisfy the following conditions:

① Curvature of field in main scanning direction and sub-scanning direction is well corrected;
② wavefront aberration is well corrected; and
③ Optical magnification is fixed through respective image heights.

As mentioned above, the scanning and imaging lens according to the first aspect of the present invention comprises 'a plurality of lenses'. These lenses have 'shapes in main scanning cross section such that a lens on the side of deflector has a convex shape in main scanning cross section in each of both surfaces, and has 'at least one surface' having a non-arc shape in main scanning cross section, and a lens on the side of surface to be scanned has a convex shape in main scanning cross section in the first surface, and has 'at least one surface' having a non-arc shape in main scanning cross section. Further, the scanning and imaging lens has 'at least two special toroidal surfaces'.

Because thus the first surface (exit surface) of the lens on the side of surface to be scanned' of the scanning and imaging lens is convex on the side of deflector in main scanning cross section, it can be prevented in the lens on the side of surface to be scanned that 'a radius of curvature in sub-scanning cross section in the lens and in proximity thereof is reduced too much'. Thereby, it is possible to make the optical magnification be fixed for respective image heights.

When a radius of curvature in sub-scanning cross section is reduced too much, wavefront aberration is likely to be generated in particular in peripheral image heights.

When the above-described lens shape is employed, a sign of coma aberration generated in the lens on the side of deflector (in particular, in the first surface thereof) is reversed to a sign of coma aberration generated in the lens on the side of surface to be scanned (because the inclination of the coma aberration is reverse). Accordingly, the coma aberrations are cancelled out one another, and, thereby, wavefront aberration can be well corrected.

Further, because each of the lenses on the side of deflector and on the side of surface to be scanned has at least one surface having a non-arc shape in main scanning cross section, it is possible to well correct curvature of field in main scanning direction. In each of first and second embodiments described later, the shape of the surface (second surface of the lens nearest to the surface to be scanned) nearest to the surface to be scanned in main scanning cross section is a concave shape. However, the shape of this surface in main scanning cross section may be a convex shape or may be a plane shape. That is, the 'shape in main scanning cross section' of the lens on the side of surface to be scanned may be of both-convex, convex-plane or meniscus shape.

Further, although the light flux emitted from the coupling lens is a 'parallel light flux' in each of the first and second embodiments, similar performance can be obtained when it is either a divergent light flux or a convergent light flux.

When the upper limit of the condition (1) is exceeded, the imaging magnification of the scanning and imaging lens increases. Thereby, when the spot diameter on the image surface is attempted to be reduced, the exit pupil in sub-scanning direction will be made too much larger in diameter. Thereby, it will be difficult to correct the wavefront aberration on the pupil through the entirety thereof. Further, a necessity of improving the NA of the coupling lens will occur. Further, change in position of image surface occurring due to change in environment and/or error in accuracy of mounting lenses will increase, and, thereby, it will be difficult to reduce the spot diameter.

When the lower limit of the condition (1) is exceeded, the magnification decreases too much, and, thereby, it is advantageous for correcting the wavefront aberration in comparison to a case where the magnification increases, because the aperture diameter becomes smaller. However, the efficiency in transmission of light toward the surface to be scanned becomes lowered, and, thereby, high-speed writing becomes difficult.

When the above-described scanning and imaging lens according to the first aspect of the present invention is used, the 'beam waist diameter' to be the spot diameter changes approximately in proportion to a change in the lateral magnification of the scanning and imaging lens. Therefore, in order to obtain a small-diameter, stable beam spot, it is essential to make the lateral magnification of the scanning and imaging lens for respective image heights be uniform. The condition (2) is a condition determining 'allowance in change' of the above-mentioned lateral magnification.

The scanning and imaging lens according to the present invention includes two 'special toroidal surfaces'. In the special toroidal surface, a curvature in sub-scanning cross section varies in main scanning direction. Accordingly, it is possible to freely change, in main scanning direction, the positions of principal points on the front and rear sides in sub-scanning direction. Thereby, it is possible to maintain a uniform magnification for respective image heights, and, to achieve a stable beam spot. A shape in sub-scanning cross section of the above-described special toroidal surface may be either an arc shape or a non-arc shape.

In each of the first and second embodiments described later, a first lens (lens on the side of deflector) and a second lens (lens on the side of surface to be scanned) have a uniform magnification through setting of positions of principal points through bending.

The above-mentioned condition (2) is an advantageous condition also in a 'multi-beam scanning device', and, as a result of making magnification for respective image heights uniform, it is possible to maintain a scanning line pitch interval satisfactorily (for example, 21.2 μm in a case of 1200 dpi, adjacent scanning).

In the scanning and imaging lens, as described above, 'at least one surface of the special toroidal surfaces' may have a non-arc shape in main scanning cross section, and, also, a non-arc shape in sub-scanning cross section, wherein the non-arc shape in sub-scanning cross section may vary according to a coordinate Y in main scanning direction, and the non-arc shape in sub-scanning cross section in each coordinate Y may be determined 'so as to correct wavefront aberration on the surface to be scanned'. Thereby, it is possible to well correct the curvature of field in each of main scanning direction and sub-scanning direction for each image height of scanning, also, to positively correct the wavefront aberration on the pupil for each image height, and, thereby, to obtain a small-diameter, stable, high-quality beam spot.

In each of the first, second and third embodiments which will be described later, the second surface (exit surface) of the lens on the side of surface to be scanned is a 'special toroidal surface in which the shape in sub-scanning cross section is a non-arc shape, and, also, the non-arc shape varies asymmetrically in main scanning direction'. However, this toroidal surface may also be employed as another surface of the scanning and imaging lens.

As the deflector, a rotational polygon mirror is common. However, in the rotational polygon mirror, 'the center of rotation of a deflection reflective surface is not located in the deflection reflective surface'. Thereby, the origin of deflection of a deflected light flux by the deflection reflective surface changes as the deflection reflective surface rotates. As a result, optical sag is generated, which results in degradation in curvature of field in sub-scanning direction in particular.

By making the curvature in sub-scanning cross section of the special toroidal surface vary 'asymmetrical with respect to the optical axis' in main scanning direction as mentioned above, it is possible to effectively correct the above-mentioned degradation in curvature of field due to sag, and, thereby, to obtain a stable beam spot.

Conventionally, when a beam spot having a small diameter equal to or shorter than 50 μm is attempted to be obtained, more than two single lenses are needed in order to achieve necessary optical characteristics because the optical characteristics such as wavefront aberration, curvature of field, uniform-velocity characteristics (fθ characteristics), optical magnification and so forth should be well improved. However, according to the present invention, a small-diameter, high-stability beam spot can be obtained by a configuration of two single lenses.

By configuring each of the lenses L1 and L2 of the scanning and imaging lens to cause it to have a 'meniscus shape such that the side of deflector is concave, the side of surface to be scanned is convex and a positive power is obtained in sub-scanning cross section on the optical axis and in the proximity thereof', it becomes easy to locate the principal point forward, and it becomes easy to have a configuration such that the magnification is uniform.

Further, as a result of configuring each of the lenses L1 and L2 to cause it to have a positive power, it is possible to set a 'radius of curvature in sub-scanning cross section of each surface' to a large value, and, thereby, to well correct the wavefront aberration while maintaining a uniform magnification.

When the upper limit of the above-mentioned condition (3) is exceeded, a central thickness of the lens L2 is large, and, also, it is difficult to form an edge of the lens properly through plastic molding. When the lower limit thereof is exceeded, it is difficult to well correct the uniform-velocity characteristics (fθ characteristics and linearity) and curvature of field in main scanning direction.

When the upper limit of the above-mentioned condition (4) is exceeded, degradation in wavefront aberration occurs, and it is difficult to obtain a small-diameter, satisfactory beam spot. When the lower limit thereof is exceeded, it is difficult to maintain a uniform magnification.

As described above, in the scanning and imaging lens according to the first aspect of the present invention, it is possible to well correct influence of sag, and, by employing a plurality of surfaces (asymmetrical surfaces) in each of which 'a paraxial curvature on sub-scanning cross section is set to vary asymmetrical along main scanning direction', it is possible to well correct both the curvature of field and optical magnification in sub-scanning direction. In comparison to employing the above-mentioned 'asymmetrical surfaces' in the same lens, a larger advantage can be obtained when they are set in surfaces which are apart from each other.

A scanning and imaging lens according to a second aspect of the preset invention has the following features:

This scanning and imaging lens consists of a plurality of lenses.

The lens on the side of deflector (lens nearest to the deflector when the scanning and imaging lens consists of more than two lenses) has 'a positive power and at least one surface having a non-arc shape' in main scanning cross section.

The lens on the side of surface to be scanned (lens nearest to the surface to be scanned when the scanning and imaging lens consists of more than two lenses) has 'the first surface having a convex shape and at least one surface having a non-arc shape' in main scanning cross section.

Further, this scanning and imaging lens has at least two 'special toroidal surfaces in each of which a curvature in sub-scanning cross section varies in main scanning direction'.

Different from the scanning and imaging lens according to the first aspect of the present innovation in which the lens on the side of deflector has 'both surfaces having convex shapes in main scanning cross section', the lens on the side of deflector of this scanning and imaging lens according to the second aspect of the present invention may have 'a plane-convex shape or a meniscus shape' other than a 'both convex shape' in main scanning cross section because the conditon thereof is such as to have a 'positive power in main scanning cross section'. Accordingly, the scanning and imaging lens according to the second aspect of the present invention implies the scanning and imaging lens according to the first aspect of the present invention.

As later described in description of the third embodiment, in the scanning and imaging lens according to the second aspect of the present invention, 'both the lens on the side of deflector and lens on the side of surface to be scanned may have meniscus shapes in main scanning cross section, and be disposed so that the convex surfaces thereof are contiguous to one another in main scanning cross section'.

Further, also this scanning and imaging lens preferably has the above-described 'lateral magnification βo in sub-scanning direction on a light path from the origin of deflection by the deflector to the surface to be scanned when a chief ray passes through the surface to be scanned at which an image height is 0' satisfying the following condition:

$$0.5 < |\beta o| < 1.5 \quad (1)$$

Further, the scanning and imaging lens preferably has the above-mentioned lateral magnification βo and a lateral magnification βh in sub-scanning direction when a chief ray passes through the surface to be scanned at which an image height is an arbitrary amount satisfying the following conditon:

$$0.9 < |\beta h/\beta o| < 1.1 \quad (2)$$

The significance of satisfaction of these conditions (1) and (2), and the fact that these conditions are advantageous conditions also in a multi-beam scanning device are same as in the case of the first aspect of the present invention.

Further, same as in the case of the first aspect of the present invention, 'at least one surface of the special toroidal surfaces' in the scanning and imaging lens in the second aspect of the present invention may have a non-arc shape in main scanning cross section, and, also, a non-arc shape in sub-scanning cross section, wherein the non-arc shape in sub-scanning cross section may vary according to a coordinate Y in main scanning direction, and the non-arc shape in sub-scanning cross section in each coordinate Y may be determined so as to correct wavefront aberration on the surface to be scanned'.

Further, any of the scanning and imaging lenses according to the second aspect of the present invention may comprise two single lenses L1 and L2 disposed from the side of deflector to the side of surface to be scanned. In this case, when X3 (D3) denotes a space (interval) between the lens L1 on the side of deflector and lens L2 on the side of surface to be scanned, and X4 (D4) denotes a thickness of the lens L2 on the side of surface to be scanned, these preferably satisfy the following condition:

$$0.10 < X4/X3 < 0.30 \quad (5)$$

When the upper limit 0.30 of the conditon (5) is exceeded, a thickness of the lens L2 on the side of surface to be scanned is likely to be large, 'distortion is likely to be generated in a surface and/or inside of the lens at a time of molding' when the lens is made of plastic, and, thereby, the wavefront aberration may be degraded. When the lower limit 0.10 is exceeded, a thickness of the lens L2 is too small, and, it is difficult to well correct the curvature of field and fθ characteristics in main scanning direction.

Further, by the reason same as in the case of the scanning and imaging lens according to the first aspect of the present invention, also in the scanning and imaging lens according to the second aspect of the present invention, each of the lenses L1 and L2 of the scanning and imaging lens may preferably have a 'meniscus shape such that the side of deflector is concave and the side of surface to be scanned is convex' in sub-scanning cross section on the optical axis and in the proximity thereof.

Also another optical scanning device according to the present invention is an 'optical scanning device deflecting a light flux from a light source by a deflector, condensing the deflected light flux onto a surface to be scanned as a beam spot by a scanning and imaging lens, and, thus, scanning the surface to be scanned by the beam spot'. Any of the above-described scanning and imaging lens according to the second aspect of the present invention may be used as the scanning and imaging lens of this optical scanning device.

As the above-mentioned deflector, same as in the case described above, 'one having a deflection reflective surface' such as rotational polygon mirror, rotational bi-surface mirror, rotational mono-surface mirror, or the like may be used. In this case, the light flux from the light source forms on or in the proximity of the deflection reflective surface a 'line image long in main scanning direction' by a 'line-image forming optical system' such as a cylindrical lens, cylindrical concave mirror, or the like. Thereby, it is possible to correct 'inclination of surface' of the deflector.

As the light source, same as in the case described above, a semiconductor laser may be preferably used. A light flux emitted by the light source may be transformed into a 'substantially parallel light flux' by a coupling lens. It is possible to transform the light flux obtained from coupling performed by the coupling lens into a 'divergent light flux or convergent light flux'.

In the optical scanning device, same as in the case described above, a spot diameter according to LSF (Line Spread Function) of $1/e^2$ intensity of a beam spot condensed onto the surface to be scanned may be set to equal to or smaller than 50 μm in each of main scanning direction and sub-scanning direction. Thereby, high-density optical scanning by the optical scanning device is made possible.

In the case where any of the scanning and imaging lenses having the two lenses L1 and L2 according to the second aspect of the present invention is used in any of these optical scanning devices, X3 and L preferably satisfy the following condition:

$$0.15 < X3/L < 0.30 \tag{6}$$

when X3 (D3) denotes the space (interval) between the lens L1 on the side of deflector and lens L2 on the side of surface to be scanned, and L denotes a distance between the origin of deflection by the deflector and the surface to be scanned.

The condition (6) is a condition for improving the curvature of field and fθ characteristics in main scanning direction of the scanning and imaging lens in the optical scanning device. When the upper limit 0.30 is exceeded, it is difficult to well correct the curvature of field and fθ characteristics in main scanning direction. When the lower limit 0.15 is exceeded, the lateral magnification in sub-scanning direction is likely to increase, and it is difficult to well correct the wavefront aberration.

Another image forming apparatus according to the present invention is also an 'image forming apparatus forming an electrostatic latent image on a latent-image carrying body through optical scanning, visualizing the formed electrostatic latent image, and obtaining a desired recorded image'. Any of the above-described optical scanning devices may be used as an optical scanning device performing the optical scanning of the latent-image carrying body of this image forming apparatus.

Also in this case, same as in the case described above, a photoconductive photosensitive body may be used as the latent-image carrying body, the electrostatic latent image may be formed thereon through uniform charging and the optical scanning thereof, and the thus-formed electrostatic latent image may be visualized as a toner image. The toner image is fixed onto a sheet-like recording medium (transfer paper, plastic sheet for an overhead projector, or the like).

In the image forming apparatus, a film for photography with silver halide may be used as the image carrying body, for example. In this case, the electrostatic latent image formed through the optical scanning by the optical scanning device is visualized by a 'method of developing in an ordinary process of photography with silver halide'. Such an image forming apparatus may be embodied as an 'optical plate-making system', a 'medical image forming apparatus' in which a result of CT scan or the like is output to a film for photography with silver halide, or the like.

This image forming apparatus according to the present invention may also be embodied as a laser printer, a laser plotter, a digital copier, a facsimile machine, or the like.

Other objects and further features of the present invention will become more apparent from the following detailed description when read in conjunction with the accompanying drawings.

DETAILED DESCRIPTION OF THE PREFERRED EMBODIMENTS

Figure 1:
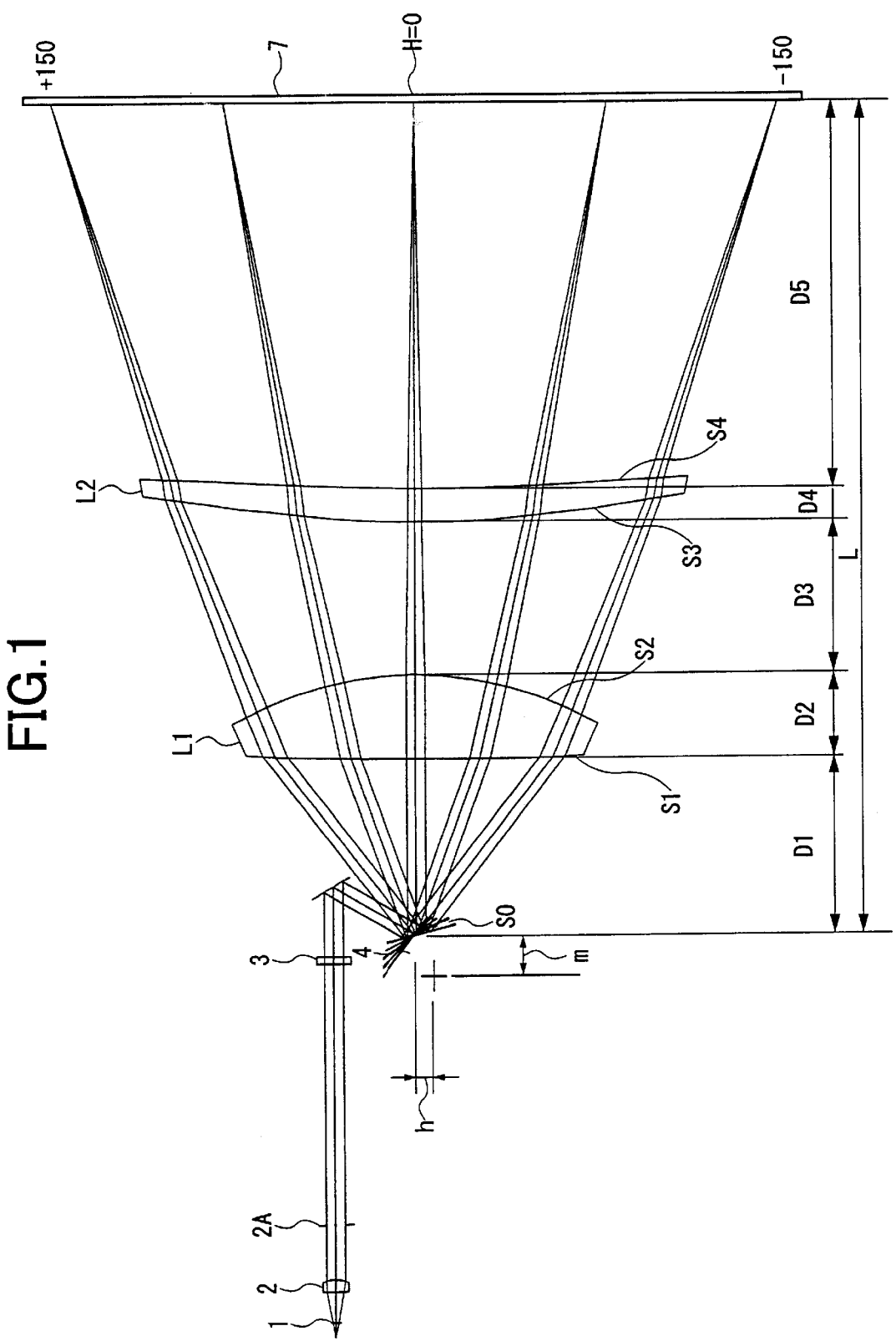
FIG. 1 illustrates an optical scanning device in each of first and second embodiments of the present invention.
Figure 2A:
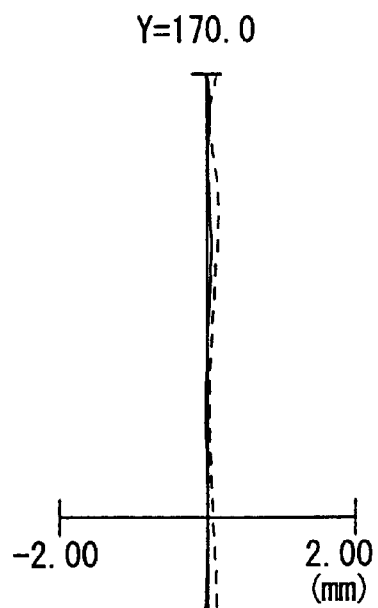
FIGS. 2A and 2B show curvature of field and uniform-velocity characteristics with regard to the first embodiment of the present invention.
Figure 2B:
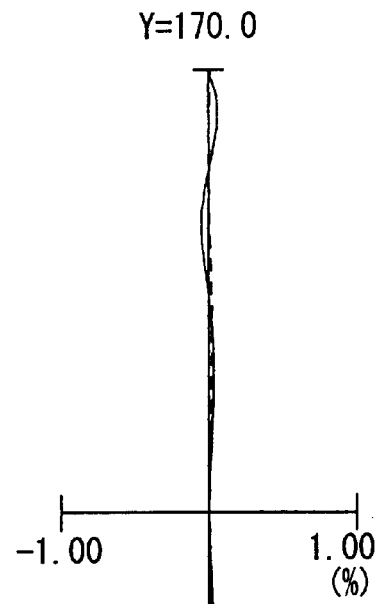
Figure 3A:
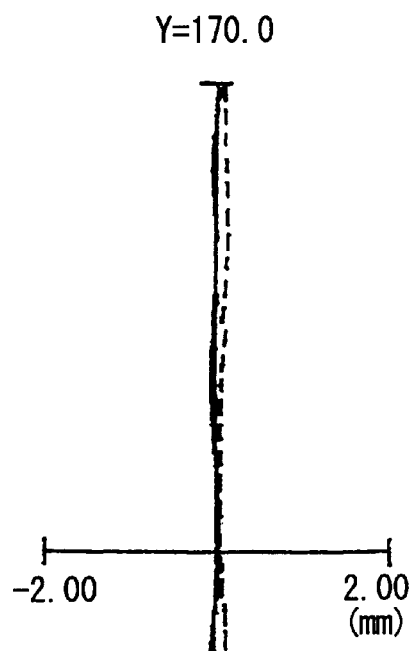
FIGS. 3A and 3B show curvature of field and uniform-velocity characteristics with regard to the second embodiment of the present invention.
Figure 3B:
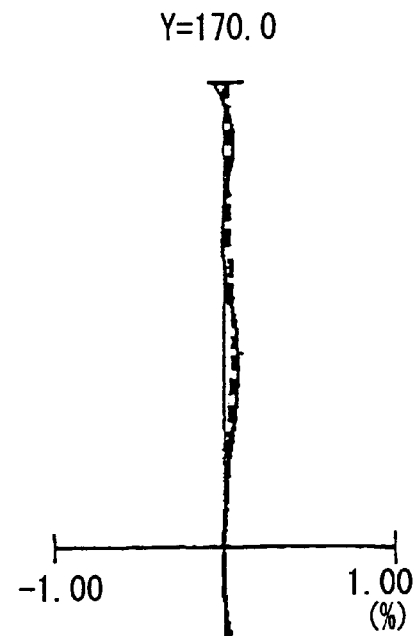

FIG. 1 shows an optical arrangement of an optical scanning device in each of the first and second embodiments of the present invention.

A light flux emitted from a light source 1 is transformed into a light flux of a form (parallel light flux, convergent light flux, divergent light flux or the like) suitable to the subsequent optical system by a coupling lens 2, then the beam of the light flux is shaped by an aperture 2A, then the light flux is converged in sub-scanning direction (direction perpendicular to the figure) by a cylindrical lens 3 acting as a 'line-image forming optical system', and forms a line image long in main scanning direction on or in the proximity of a deflection reflective surface of a rotational polygon mirror 4 acting as a 'deflector'. In the figure, the light path of the light flux is bent by a fixed plane mirror between the cylindrical lens 3 and rotational polygon mirror 4.

The light flux reflected by the deflection reflective surface is deflected thereby at a uniform angular velocity while the rotational polygon mirror 4 is rotating at a uniform angular velocity (FIG. 1 showing 'rotation states of the deflection reflective surface' appearing while the rotational polygon mirror 4 is rotating and the deflected light fluxes in the respective positions of the deflection reflective surface), passes through lenses L1 and L2 which constitute a scanning and imaging lens, and, by the functions of the lenses L1 and L2, is condensed to a beam spot on a surface 7 to be scanned (substantially, a photosensitive surface of a photoconductive photosensitive body or the like) and scans the surface 7 to be scanned.

Figure 7:
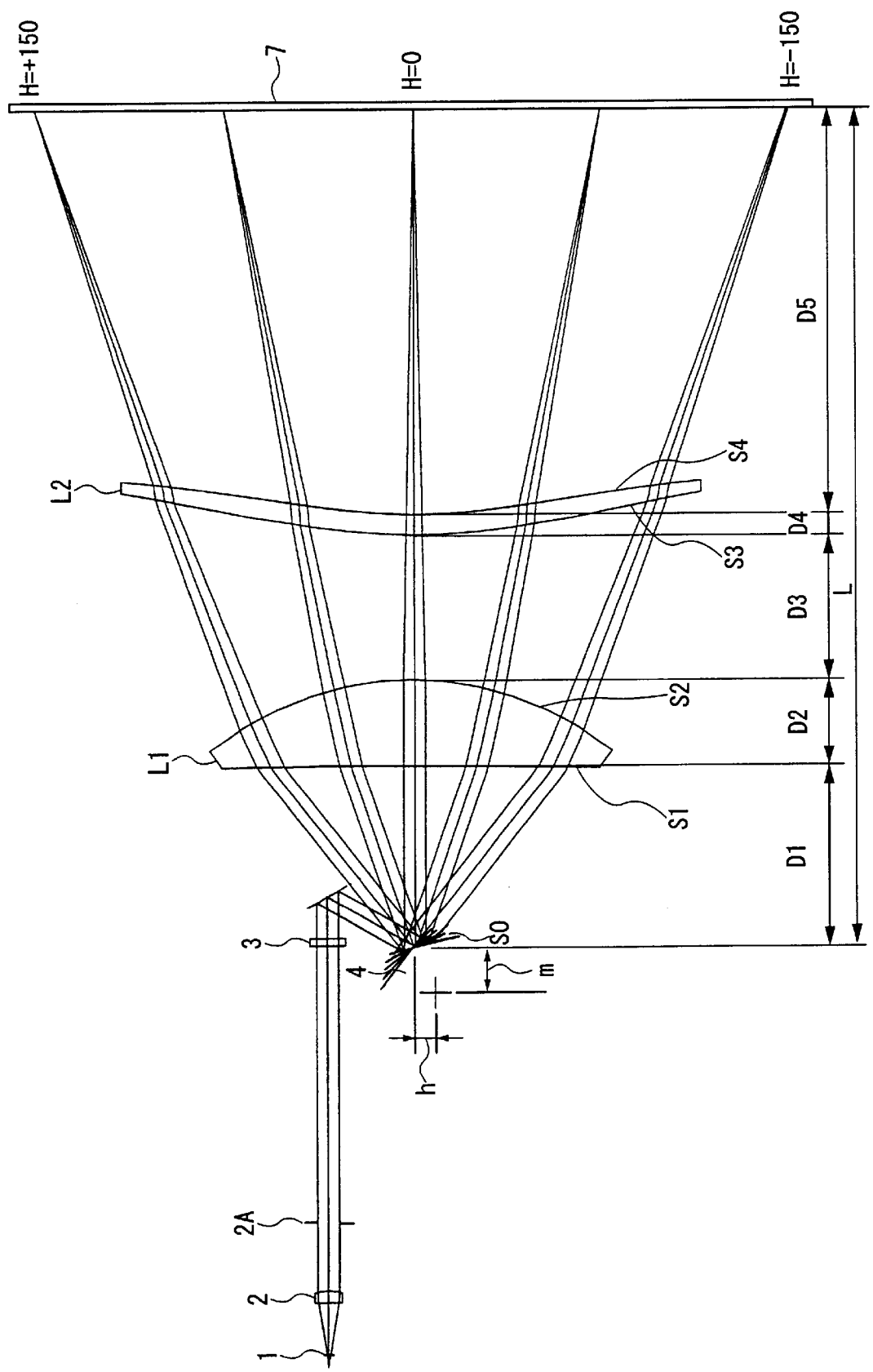
FIG. 7 shows an optical scanning device in a third embodiment of the present invention.

FIG. 7 shows an optical scanning device in the third embodiment of the present invention.

In order to avoid complexity, the same reference numerals as those of FIG. 1 are given to parts/components having no anxiety of confusion.

The differences from each of the first and second embodiments shown in FIG. 1 are as follows: Both surfaces of the lens L1 on the side of deflector of the scanning and imaging lens have convex shapes in main scanning cross section (shown in the figure) in each of the first and second embodiments shown in FIG. 1.

However, the shape of the lens L1 in main scanning cross section (shown in the figure) has a meniscus shape having a concave shape facing the deflector in the third embodiment shown in FIG. 7. Also in the third embodiment shown in FIG. 7, the lens L1 has a positive power in main scanning cross section.

The first, second and third embodiments will now be described in detail.

'Expressions for determining shapes of lens surfaces' in each embodiment will now be described. However, the contents of the present invention are not limited to these expressions.

In order to determine lens surfaces, a coordinate in main scanning direction in the lens or in the proximity thereof is assumed as Y, a coordinate in sub-scanning direction is assumed as Z, and an axis in X direction passing through the origin of the Y and Z coordinates is assumed as the optical axis of the lens.

A general expression of a lens surface is determined as:

$$f(Y,Z)=fm(Y)+fs(Y,Z) \quad (7)$$

The first term fm(Y) of the right side of the expression (7) expresses 'a shape in main scanning cross section', the second term fs(Y,Z) expresses a shape in sub-scanning cross section at a position of coordinate Y in main scanning direction.

The above-mentioned shape in main scanning cross section will now be expressed as a depth X in optical-axis direction by the following polynominal of fm(Y), which is a well-known expression for non-arc shape, using a radius Rm of paraxial curvature in main scanning cross section on the optical axis, a distance Y from the optical axis in main scanning direction, a conic constant Km, high-order coefficients Am1, Am2, Am3, Am4, Am5, Am6, . . .

$$fm(Y)=(Y^2/Rm)/[1+\sqrt{1-(1+Km)(4Y/Rm)^2}]$$

$$++Am1\cdot Y+Am2\cdot Y^2+Am3\cdot Y^3+Am4\cdot Y^4+Am5\cdot Y^5++Am6\cdot Y^6+ \quad (8)$$

In the expression (8), when any of the odd-order coefficients Am1, Am3, Am5, . . . is not 0, the non-arc shape is an 'asymmetrical shape in main scanning direction'. In each of the first, second and third embodiments, only the even-order coefficients are used, and, thereby, the shape is symmetrical in main scanning direction.

In the above expression, 'Y^2' denotes 'Y$^2$', for example.

Further, the above-mentioned fs(Y,Z) is expressed as follows:

$$fs(Y, Z)=(Y^2\cdot Cs)/[1+\sqrt{1-(1+Ks)(Y\cdot Cs)^2}]++(F0+F1\cdot Y+F2\cdot Y^2+F3\cdot Y^3+F4$$

$$\cdot Y^4+ \ldots)\cdot Z+(G0+G1\cdot Y+G2\cdot Y^2+G3\cdot Y^3+G4\cdot Y^4+ \ldots)\cdot Z^2+$$

$$(H0+H1\cdot Y+H2\cdot Y^2+H3\cdot Y^3+H4\cdot Y^4 + \ldots)\cdot Z^3+(I0+I$$

$$1\cdot Y+I2\cdot Y^2+I3\cdot Y^3+I4\cdot Y^4+ \ldots)\cdot Z^4+(J0+J1\cdot Y+J2\cdot Y^2+J3\cdot Y^3+$$
$$J4\cdot Y^4+ \ldots)\cdot Z^5+ \quad (9)$$

where $$Cs=(1/Rs0)+B1\cdot Y+B2\cdot Y^2+B3\cdot Y^\cdot B4\cdot Y^\cdot 4+B5\cdot Y^\cdot 5+ \quad (10)$$

$$Ks=Ks0+C1\cdot Y+C2+Y^2+C3\cdot Y^3+C4\cdot Y^4+C5\cdot Y^5+ \quad (11)$$

and 'Rs0' denotes a radius of paraxial curvature in sub-scanning cross section including the optical axis.

When any of the odd-order coefficients B1, B3, B5, . . . is other than 0, variation in main scanning direction of a curvature in sub-scanning cross section is 'asymmetrical in main scanning direction'.

Similarly, when any of the 'odd power coefficients of Y' expressing a non-arc amount such as C1, C3, C5, . . . , F1, F3, F5, . . . , G1, G3, G5, . . . and so forth is other than 0, variation in main scanning direction of a non-arc amount in sub-scanning direction is 'asymmetrical in main scanning direction'.

In the first embodiment, in the entrance surface (first surface) of the lens L1 and the exit surface (fourth surface) of the lens L2, variation in main scanning direction of a curvature in sub-scanning cross section is asymmetrical.

The exit surface (fourth surface) of the lens L2 has a non-arc shape in the sub-scanning cross section.

In each of the second and third embodiments, in all the surfaces of the lenses L1 and L2, variation in main scanning direction of a curvature in sub-scanning cross section is asymmetrical. The exit surface (fourth surface) of the lens L2 has a non-arc shape in sub-scanning cross section.

The first and second embodiments are embodiments having the optical configuration shown in FIG. 1.

The first embodiment will now be described.

The light source 1 is a semiconductor laser having a wavelength 780 nm of light emitted thereof. The coupling function of the coupling lens 2 is 'collimator function', and the light flux emitted from the coupling lens 2 is a parallel light flux.

The aperture 2A has aperture widths of 9.0 mm in main scanning direction and 1.6 mm in sub-scanning direction.

The focal length of the cylindrical lens 3 is 58.7 mm.

The rotational polygon mirror 4 has five deflection reflective surfaces, and a radius of inscribed circle thereof is 20 mm, and, the rotational center thereof is away from the deflection origin (a position at which a chief ray crosses the deflection reflective surface when the chief ray of deflected light flux is in parallel to the optical axes of the lenses L1 and L2) by a distance m=18.475 mm in optical axis direction, and a distance h=8.0 mm in main scanning direction.

Further, in the state in which the chief ray of deflected light flux is parallel to the optical axes of the lenses L1 and L2, an angle (referred to as an 'incidence angle to the rotational polygon mirror', hereinafter) formed between this chief ray and a 'chief ray of light flux incident on the deflection reflective surface from the light source (directly from the plane mirror)' is 60 degrees.

Further, the angle of view is −38 degrees through +38 degrees.

Data for the above-mentioned radius Rm of paraxial curvature, radius Rs0 of paraxial curvature, an interval x between surfaces (in the state in which each shift amount y is 0) on a chief ray of deflected light flux passing through the surface 7 to be scanned at which an image height H is 0, a shift amount y of lens from this chief lay in upward direction in the figure, a refractive index n of lens material will now be listed.

| | SURFACE NUMBER | Rm (mm) | Rs0 (mm) | x (mm) | y (mm) | n |
|---|---|---|---|---|---|---|
| DEFLECTION REFLECTIVE SURFACE | S0 | ∞ | ∞ | 72.560 (D1) | | 1 |
| LENS L1 | S1 | 1616.426 | −50.145 | 35.0 (D2) | 0.406 | 1.52398 |
| | S2 | −146.513 | −199.813 | 61.933 (D3) | | 1 |
| LENS L2 | S3 | 400.875 | −72.026 | 14.0 (D4) | 0.403 | 1.52398 |
| | S4 | 824.882 | −27.588 | 160.556 (D5) | | 1 |

The first surface S1 is a 'special toroidal surface having a radius of curvature in sub-scanning cross section varying asymmetrically in main scanning direction'; second and third surfaces S2 and S3 are 'special toroidal surfaces'; and froth surface S4 is a 'special toroidal surface having a non-arc shape in sub-scanning cross section, the non-arc shape varying asymmetrically in main scanning direction'.

Values of the above-mentioned coefficients for determining the above-mentioned first through fourth surfaces of the lenses L1 and L2 will now be shown. In the following expressions, 'E+2' denotes '$\times 10^2$', and 'E−13' denotes '$\times 10^{-13}$', for example.

First Surface S1 (Entrance Surface of the Lens L1 on the Side of Deflector)
Rm=1616.426, K=1.9758E+2, Am4=1.2807E−8, Am6=−6.3739E−13, Am8=−9.4279E−17, Am10=5.9653E−21 Rso=−50.145, B1=−1.1619E−5, B2=2.2760E−6, B3=2.7143E−9, B4=−1.5441E−10 B5=−4.2654E−13, B6=6.4174E−15, B7=9.1795E−19, B8=−1.2300E−19, B9=1.4532E−20, B10=−1.8814E−22, B11=−1.4681E−24, B12=−2.6702E−26

Second Surface S2 (Exit Surface of the Lens L1 on the Side of Deflector)
Rm=−146.513, K=−1.8570E−1, Am4=1.7743E−8, Am6=1.3838E−13, Am8=−4.3545E−17, Am10=7.1684E−21 Rso=−199.813, B2=−2.1247E−6, B4=1.8045E−11, B6=2.7156E−14, B8=6.9237E−19 B10=−2.6853E−22, B12=−5.7783E−26

Third Surface S3 (Entrance Surface of the Lens L2 on the Side of Surface to be Scanned)
Rm=400.875, K=−1.2603E+1, Am4=−7.3492E−9, Am6=−2.1056E−13, Am8=8.1727E−18, Am10=5.4093E−22, Am12=−1.0819E−26, Am14=−2.0391E−32 Rso=−72.026, B2=−1.9618E−7, B4=2.2296E−11, B6=−1.0216E−15, B8=1.0811E−20, B10=6.3632E−25, B12=−3.6449E−29

Fourth Surface S4 (Exit Surface of the Lens L2 on the Side of Surface to be Scanned)
Rm=824.882, K=−7.1068E+1, Am4=−1.3238E−8, Am6=9.6624E−14, Am8=1.8875E−17, Am10=−3.1016E−22, Am12=7.2979E−27, Am14=2.3052E−32 Rso=−27.588, B1=−8.5460E−7, B2=4.1615E−7, B3=−2.5226E−11, B4=−2.9599E−11, B5=2.1135E−16, B6=1.1604E−15, B7=4.3715E−22, B8=−1.0981E−21, B9=5.5597E−24, B10=−7.7846E−25, B11=−1.6169E−29, B12=3.2622E−30 Ks0=−3.9399E−1, C1=1.7960E−4, C2=2.4246E−6, C3=4.4377E−8, C4=4.5838E−10, C5=−2.4380E−12, C6=−3.3957E−14, C7=4.1317E−17, C8=6.8052E−19 I0=2.8688E−6, I1=4.0115E−11, I2=1.6903E−11, I3=3.5723E−14, I4=−8.7422E−15, I5=1.9643E−18, I6=8.6034E−19, I7=6.1604E−23, I8=−3.3469E−23, I9=−3.6931E−28, I10=4.5355E−28 K0=−1.5263E−9, K1=−3.1009E−11, K2=−8.9028E−12, K3=5.0172E−14, K4=3.2408E−15, K5=−7.7026E−18, K6=−4.1043E−19, K7=5.1175E−22, K8=2.3678E−23, K9=1.5500E−26, K10=−6.3709E−28, K11=1.7480E−31, K12=6.5028E−33

The second embodiment will now be described.

The light source 1 is a semiconductor laser having a wavelength 655 nm of light emitted therefrom. The coupling function of the coupling lens 2 is 'collimator function', and the light flux emitted from the coupling lens is a parallel light flux.

The aperture 2A has aperture widths of 7.84 mm in main scanning direction and 2.76 mm in sub-scanning direction.

The focal length of the cylindrical lens 3 is 70.0 mm.

The rotational polygon mirror 4 has five deflection reflective surfaces, and a radius of inscribed circle thereof is 18 mm, and, the rotational center thereof is away from the deflection origin by a distance m=16.628 mm in optical axis direction, and a distance h=7.2 mm in main scanning direction. An incidence angle to the rotational polygon mirror is 60 degrees. The angle of view is −38 degrees through +38 degrees.

Data for the above-mentioned radius Rm of paraxial curvature, radius Rs0 of paraxial curvature, an interval x between surfaces (in the state in which each shift amount y is 0) on a chief ray of deflected light flux passing through the surface 7 to be scanned at which an image height H is 0, a shift amount y of lens from this chief lay in upward direction in the figure, a refractive index n of lens material will now be listed.

| | SURFACE NUMBER | Rm (mm) | Rs0 (mm) | x (mm) | y (mm) | n |
|---|---|---|---|---|---|---|
| DEFLECTION REFLECTIVE SURFACE | S0 | ∞ | ∞ | 72.492 (D1) | | 1 |
| LENS L1 | S1 | 1617.537 | −259.916 | 35.0 (D2) | 0.206 | 1.52718 |
| | S2 | −146.536 | −80.074 | 90.089 (D3) | | 1 |
| LENS L2 | S3 | 413.676 | −59.597 | 13.940 (D4) | 0.204 | 1.52718 |
| | S4 | 824.882 | −30.107 | 151.706 (D5) | | 1 |

Each of the first, second and third surfaces S1, S2 and S3 is a 'special toroidal surface having a radius of curvature in sub-scanning cross section varying asymmetrically in main scanning direction'; and fourth surface S4 is a 'special toroidal surface having a non-arc shape in sub-scanning cross section, the non-arc shape varying asymmetrically in main scanning direction'.

Values of the above-mentioned coefficients for determining the above-mentioned first through fourth surfaces will now be shown.

First Surface S1 (Entrance Surface of the Lens L1 on the Side of Deflector)

Rm=1617.537, K=−1.9337E−1, Am4=1.7905E−8, Am6=2.8475E−13, Am8=−3.7228E−17, Am10=5.9304E−21 Rso=−295.916, B1=3.8163E−6, B2=−8.9442E−7, B3=−7.1777E−10, B4=1.0620E−10, B5=8.0561E−14, B6=−9.5854E−15, B7=−1.2058E−17, B8=−2.9218E−19, B9=8.5505E−22, B10=3.40077E−22, B11=2.2597E−26, B12=1.0818E−27

Second Surface S2 (Exit Surface of the Lens L1 on the Side of Deflector)

Rm=−146.526,K=−1.3947E+1, Am4=−6.7900E−9, Am6=−2.0465E−13, Am8=7.4657E−18, Am10=5.2824E−22, Am12=−8.1428E−27, Am14=−3.7707E−33 Rso=−80.074, B1=2.8847E−6, B2=−1.1609E−7, B3=−1.9647E−10, B4=1.4403E−11, B5=1.1509E−14, B6=−8.9639E−16, B7=−4.6935E−19, B8=1.1227E−20, B9=1.3265E−23, B10=1.3121E−24, B11=−2.2260E−28, B12=−7.3153E−29

Third Surface S3 (Entrance Surface of the Lens L2 on the Side of Surface to be Scanned)

Rm=413.676, K=−1.3947E+1, Am4=−6.7900E−9, Am6=−2.0465E−13, Am8=7.4657E−18, Am10=5.2824E−22, Am12=−8.1428E−27, Am14=−3.7707E−33 Rso=−59.597, B1=2.8847E−6, B2=−1.1609E−7, B3=−1.9647E−10, B4=1.4403E−11, B5=1.1509E−14, B6=−8.9639E−16, B7=−4.6935E−19, B8=1.1227E−20, B9=1.3265E−23, B10=1.3121E−24, B11=−2.2260E−28, B12=−7.3153E−29

Fourth Surface S4 (Exit Surface of the Lens L2 on the side of surface to be scanned)

Rm=824.882,K=−6.9066E+1, Am4=−1.3483E−8, Am6=8.9530E−14, Am8=1.9362E−17, Am10=−2.8403E−22, Am12=6.0443E−27, Am14=1.0767E−31 Rso=−30.107, B1=2.5964E−7, B3=−2.2608E−11, B5=1.0492E−15, B7=−9.2108E−22, B9=−1.4922E−24, B11=2.0387E−29 Ks0=−3.7766E−1, C1=5.1394E−6, C2=−4.7466E−5, C3=−5.5410E−8, C4=3.5948E−8, C5=4.3084E−11, C6=−6.0684E−12, C7=−5.7729E−15, C8=2.3739E−16, C9=1.6716E−19, C10=1.7780E−20, C11=3.3715E−24, C12=−1.0989E−24 I0=2.1618E−6, I1=3.6416E−10, I2=9.3075E−10, I3=−3.1672E−13, I4=−4.6925E−13, I5=3.6532E−17, I6=1.0567E−16, I7=3.2030E−21, I8=−1.1714E−20, I9=−6.3093E−25, I10=6.3027E−25, I11=2.3556E−29, I12=−1.3187E−29 K0=9.1006E−9, K1=−1.3347E−11, K2=−4.8215E−11, K3=3.5535E−15, K4=2.5809E−14, K5=6.1734E−18, K6=−5.5228E−18, K7=−1.2408E−21, K8=5.4705E−22, K9=6.8910E−26, K10=−2.4762E−26,K11=−9.0920E−31, K12=4.0593E−31

FIGS. 2A, 2B, 3A and 3B show curvature of field (solid lines for sub-scanning direction, and broken lines for main scanning direction) and uniform-velocity characteristics (solid lines for linearity and broken lines for fθ characteristics) for the first and second embodiments. As it can be seen therefrom, the first and second embodiments have very sufficient curvature of field and uniform-velocity characteristics.

The parameter βo of the above-mentioned condition (1) is '0.77' in the first embodiment, and '1.1' in the second embodiment. Accordingly, each of the first and second embodiments satisfies the condition (1).

Further, each of the first and second embodiments also satisfies the above-mentioned condition (2).

Each of the first and second embodiments well corrects the wavefront aberration on the surface to be scanned.

FIGS. 4A, 4B, 5A and 5B show depth curves (horizontal axis being of defocus amount and vertical axis being of spot diameter) of beam spot when on the order of 30 μm is set as a spot diameter according to LSF (Lien Spread Function) of $1/e^2$ intensity of beam spot.

Figure 4A:
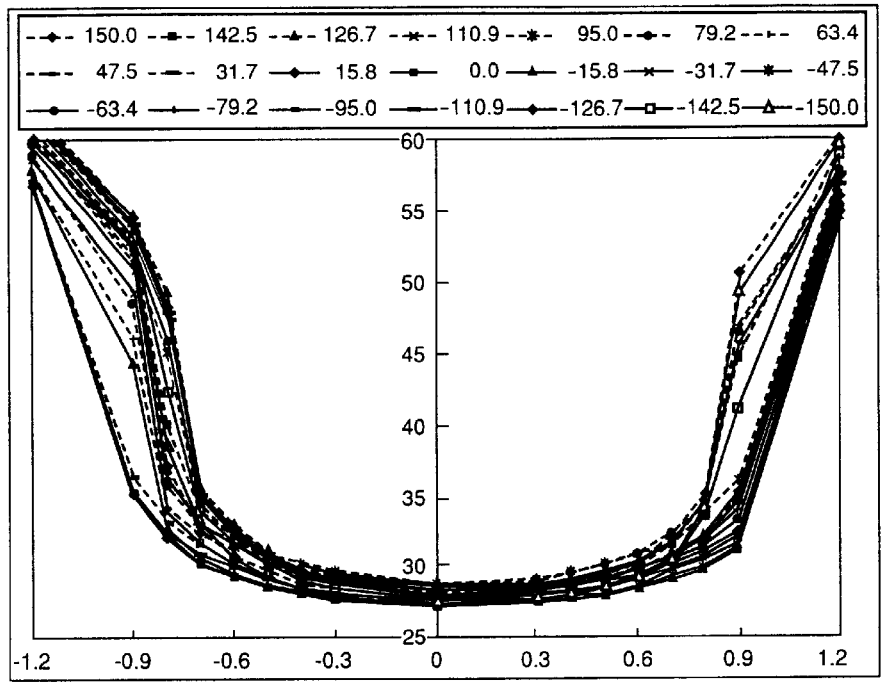
FIGS. 4A and 4B show depth curves in the first embodiment of the present invention.
Figure 4B:
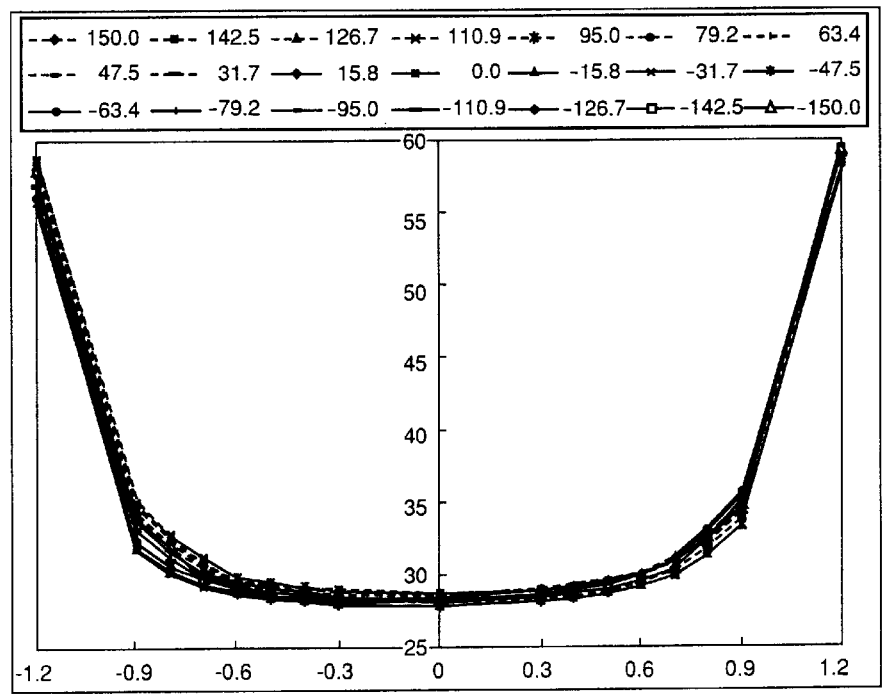
Figure 5A:
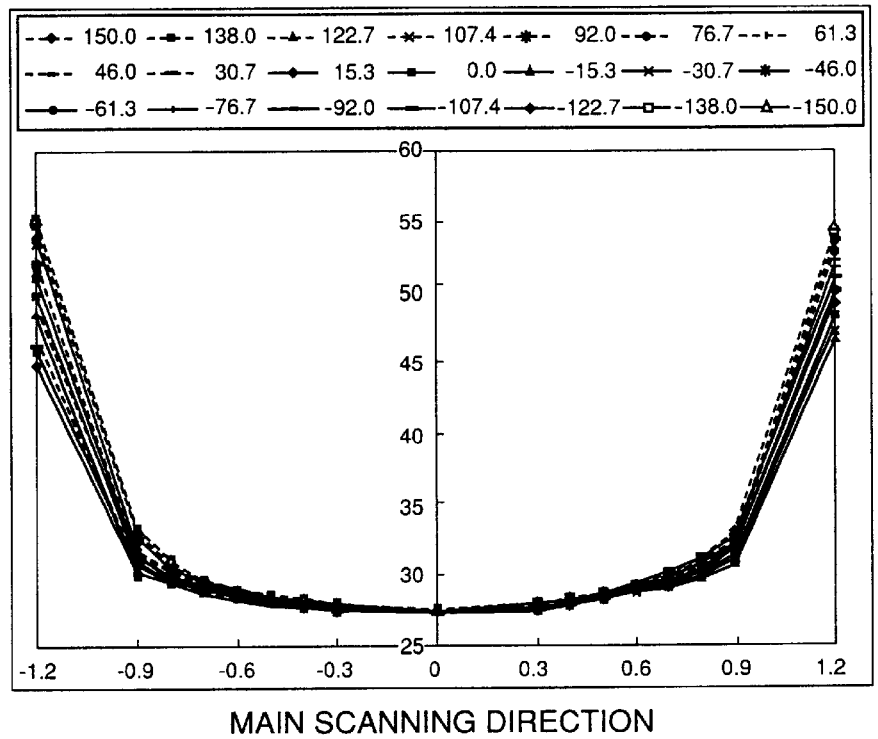
FIGS. 5A and 5B show depth curves in the second embodiment of the present invention.
Figure 5B:
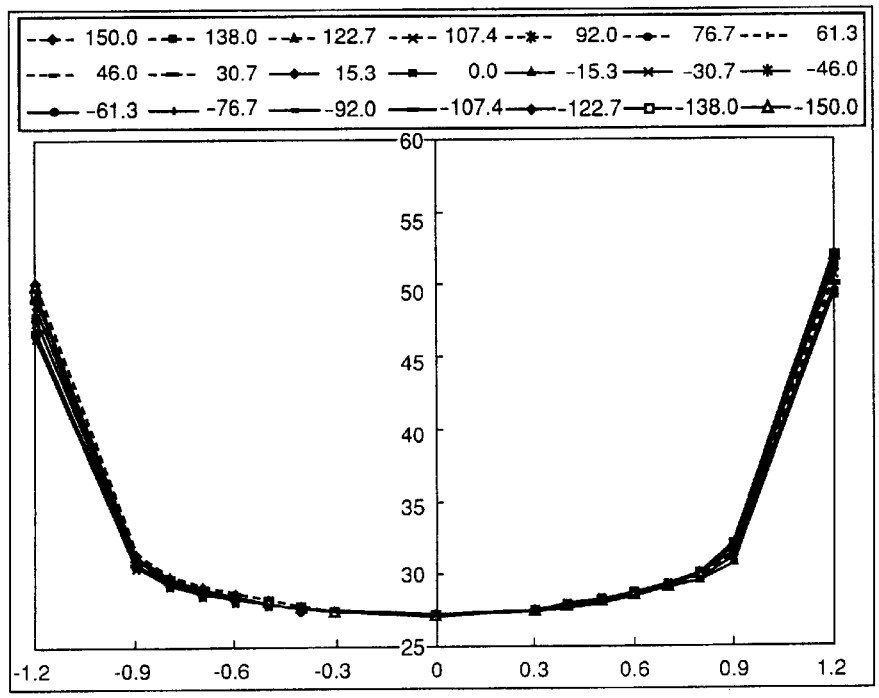

FIGS. 4A and 4B are those with regard to the first embodiment, and FIGS. 5A and 5B are those with regard to the second embodiment. As can be seen from these depth curves, a 'range (allowance of focal depth) through which change in spot diameter with respect to defocus amount of beam spot is small' is wide, and a stable, small-diameter, high-quality beam spot can be achieved, in each of the first and second embodiments.

The value of the parameter |Rm2/Rm3| of the above-mentioned condition (3) is '0.37' in the first embodiment, and '0.35' in the second embodiment. Accordingly, each of the first and second embodiments satisfies the condition (3). Further, the value of the parameter |Rs4/Rs2| of the above-mentioned condition (4) is '0.14' in the first embodiment, and '0.38' in the second embodiment. Accordingly, each of the first and second embodiments satisfies the condition (4).

The scanning and imaging lens in each of the above-described first and second embodiments is a scanning and imaging lens condensing a light flux deflected by the deflector 4 onto the surface 7 to be scanned as a beam spot, and consists of the plurality of lenses L1 and L2.

The shape in main scanning cross section of the lens L1 on the side of deflector is such that 'both surfaces have convex shapes, and at least one surface has a non-arc shape'. The shape in main scanning cross section of the lens L2 on the side of surface to be scanned is such that 'the first surface has a convex shape, and at least one surface has a non-arc shape'. Further, the scanning and imaging lens has at least two 'special toroidal surfaces in each of which a curvature in sub-scanning cross section varies in main scanning direction'.

Further, the lateral magnification βo in sub-scanning direction in the light path from the origin of deflection by the deflector 4 to the surface 7 to be scanned when the chief ray of deflected light flux passes through the position at which the image height H is 0 satisfies the above-mentioned condition (1), and this lateral magnification βo and the lateral magnification βh in sub-scanning direction in the light path from the origin of deflection by the deflector 4 to the surface 7 to be scanned when the chief ray of deflected light flux passes through a position at which the image height is an arbitrary amount satisfies the above-mentioned conditon (2).

Further, 'at least one surface (fourth surface S4 in each of the first and second embodiments) of the special toroidal surfaces' in the scanning and imaging lens has a non-arc shape in main scanning cross section, and, also, a non-arc shape in sub-scanning cross section, wherein the non-arc shape in sub-scanning cross section varies according to a coordinate Y in main scanning direction, and the non-arc shape in sub-scanning cross section in each coordinate Y is determined so as to correct wavefront aberration on the surface to be scanned.

Further, at least one surface (the first surface S1 in the first embodiment, and each of the first, second and third surfaces S1, S2 and S3 in the second embodiment) of the special toroidal surfaces is such that 'a curvature in sub-scanning cross section varies asymmetrically with respect to the optical axis in main scanning direction'.

Further, the scanning and imaging lens in each of the first and second embodiments consists of the two single lenses L1 and L2 disposed from the side of deflector 4 to the side of surface 7 to be scanned. Further, each of the lenses L1 and L2 of the scanning and imaging lens has a 'meniscus shape on sub-scanning cross section such that the side of deflector is concave and the side of surface to be scanned is convex' on the optical axis and in the proximity thereof.

Further, each of the lenses L1 and L2 has a positive power in main scanning cross section, and a radius Rm2 of curvature of the second surface of the lens L1 on the optical axis in main scanning cross section and a radius Rm3 of curvature of the first surface of the lens L2 on the optical axis in main scanning cross section satisfy the above-mentioned condition (3). Further, a radius Rs2 of curvature of the second surface of the lens L1 on the optical axis in sub-scanning cross section and a radius Rs4 of curvature of the second surface of the lens L2 on the optical axis in sub-scanning cross section satisfy the above-mentioned condition (4). Further, each of the lenses L1 and L2 has at least one special toroidal surface in which 'a curvature in sub-scanning cross section varies with respect to the optical axis in main scanning direction'.

Further, the optical scanning device in each of the first and second embodiments shown in FIG. 1 is an 'optical scanning device deflecting a light flux from the light source 1 by the deflector 4, condensing the deflected light flux onto the surface 7 to be scanned as a beam spot by the scanning and imaging lens L1 and L2, and, thus, scanning the surface 7 to be scanned by the beam spot'. The deflector 4 has the deflection reflective surface, the light flux from the light source 1 forms on or in the proximity of the deflection reflective surface a 'line image long in main scanning direction' by the 'line-image forming optical system' 3. The semiconductor laser is used as the light source 1, a light flux emitted by the light source 1 is transformed into a 'substantially parallel light flux' by the coupling lens 3.

The spot diameter (on the order of 30 μm in each of the first and second embodiments) according to LSF (Line Spread Function) of $1/e^2$ intensity of a beam spot condensed onto the surface 7 to be scanned is thus set to equal to or larger than 50 μm in each of main scanning direction and sub-scanning direction.

The third embodiment according to the present invention will now be described. The configuration of the third embodiment is shown in FIG. 7.

The light source 1 is a semiconductor laser having a wavelength 780 nm of light emitted therefrom. The coupling function of the coupling lens 2 is 'collimator function', and the light flux emitted from the coupling lens is a parallel light flux.

The focal length of the cylindrical lens 3 is 58.7 mm.

The rotational polygon mirror 4 has five deflection reflective surfaces, and a radius of inscribed circle thereof is 20 mm, and, the rotational center thereof is away from the deflection origin by a distance m=18.475 mm in optical axis direction, and a distance h=8.0 mm in main scanning direction. An incidence angle to the rotational polygon mirror is 60 degrees. The angle of view is −38 degrees through +38 degrees.

Data for the above-mentioned radius Rm of paraxial curvature, radius Rs0 of paraxial curvature, an interval x between surfaces (in the state in which each shift amount y is 0) on a chief ray of deflected light flux passing through the surface 7 to be scanned at which an image height H is 0, a shift amount y of lens from this chief lay in upward direction in the figure, a refractive index n of lens material will now be listed.

|  | SURFACE NUMBER | Rm (mm) | Rs0 (mm) | x (mm) | y (mm) | n |
|---|---|---|---|---|---|---|
| DEFLECTION REFLECTIVE SURFACE | S0 | ∞ | ∞ | 71.964 |  | 1 |
| LENS L1 | S1 | −13040 | −20.329 | 34.608 (D1) | 0.851 | 1.52398 |
|  | S2 | −123.555 | −48.934 | 57.863 (D2) |  | 1 |
| LENS L2 | S3 | 208.943 | −72.025 | 8.549 (D3) | 0.848 | 1.52398 |
|  | S4 | 223.218 | −27.865 | 163.909 (D4) |  | 1 |

Each of the first, second and third surface S1, S2 and S3 is a 'special toroidal surface having a radius of curvature in sub-scanning cross section varying asymmetrically in main scanning direction'; and fourth surface S4 is a 'special toroidal surface having a non-arc shape in sub-scanning cross section, the non-arc shape varying asymmetrically in main scanning direction'.

Values of the above-mentioned coefficients for determining the above-mentioned first through fourth surfaces will now be shown.

First Surface S1 (Entrance Surface of the Lens L1 on the Side of Deflector)
Rm=−13040.000, K=−4.5293E+3, Am4=1.9284E−9, Am6=−4.9717E−13, Am8=−1.2432E−16, Am10= 8.1815E−21 Rso=−20.329, B1=−7.3332E−7, B2=1.0796E−5, B3=−2.7978E−9, B4=−9.4126E−10, B5=5.9249E−13, B6=−1.1162E−13, B7=1.5606E−16, B8=1.3006E−17, B9=−6.4227E−20, B10=8.5672E−23, B11=5.5157E−24, B12=−6.2775E−26

Second Surface S2 (Exit Surface of the Lens L1 on the Side of Deflector)
Rm=−123.555, K=−1.6348E−1, Am4=2.1097E−8, Am6= 4.1361E−14, Am8=−8.1140E−17, Am10=−7.8753E−21 Rso=−48.934, B1=3.0930E−6, B2=−9.4868E−7, B3=− 6.4516E−10, B4=−5.3114E−10, B5=7.0445E−14, B6=1.4500E−13, B7=−1.3000E−17, B8=2.5717E−18, B9=2.0335E−21, B10=−1.0234E−21, B11=1.7665E−26, B12=−3.8069E−25

Third Surface S3 (Entrance Surface of the Lens L2 on the Side of Surface to be Scanned)
Rm=208.943, K=−1.6137E+1, Am4=−6.3468E−9, Am6=− 5.0784E−13, Am8=1.6692E−17, Am10=2.9664E−22, Am12=−5.0329E−27, Am14=1.4974E−32 Rso=−72.025, B1=2.6920E−6, B2=−2.9897E−7, B3=−1.4204E−10, B4=2.4458E−11, B5=6.4768E−15, B6=−5.5813E−16, B7=5.0667E−20, B8=1.1154E−20, B9=−3.3535E−23, B10=−2.0031E−24, B11=2.0280E−27, B12=1.9016E−29

Fourth Surface S4 (Exit Surface of the Lens L2 on the Side of Surface to be Scanned)

Rm=223.218, K=−2.0129E+1, Am4=−2.5753E−8, Am6=2.2198E−13, Am8=9.8677E−18, Am10=−1.8627E−22, Am12=5.4516E−27, Am14=1.1993E−31 Rso=−27.865, B1=1.9073E−6, B2=4.3640E−7, B3=−3.0229E−10, B4=−3.0360E−11, B5=3.3461E−14, B6=5.8128E−16, B7=−1.4522E−18, B8=−9.7428E−21, B9=−2.2784E−23, B10=1.3085E−24, B11=2.7738E−27, B12=2.9926E−30 Ks0=−4.6333E−1, C1=2.0423E−4, C2=2.3413E−4, C3=−2.9304E−7, C4=−9.2471E−8, C5=5.7472E−11, C6=1.1886E−11, C7=−2.7926E−15, C8=−4.7391E−16 I0=2.8034E−6, I1=−1.1104E−9, I2=−2.4261E−10, I3=−9.2195E−14, I$=7.9233E−14, I5=3.2684E−17, I6=−8.5911E−18, I7=−1.6547E−21, I8=2.9448E−22, K0=−1.9982E−8, K1=5.4827E−11, K2=5.0154E−11, K3=−4.0266E−14, K4=−1.9884E−14, K5=7.8063E−18, K6=2.5034E−18, K7=−3.8379E−22, K8=−9.7915E−23

Figure 8A:
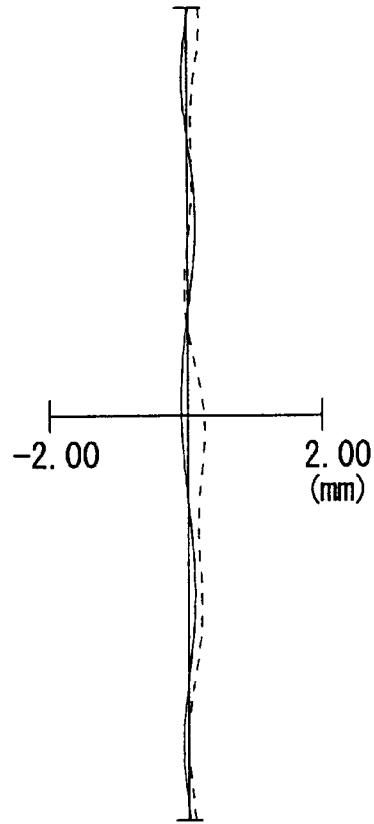
FIGS. 8A and 8B show curvature of field and uniform-velocity characteristics with regard to the third embodiment of the present invention.
Figure 8B:
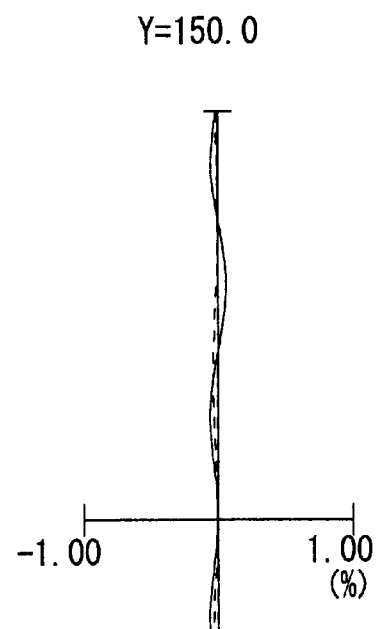

FIGS. 8A and 8B show curvature of field (solid line for sub-scanning direction, and broken line for main scanning direction) and uniform-velocity characteristics (solid line for linearity and broken line for fθ characteristic) for the third embodiment. As it can be seen therefrom, the third embodiments has very sufficient curvature of field and uniform-velocity characteristics.

Further, the parameter βo of the above-mentioned condition (1) is '0.77' in the third embodiment. Accordingly, the third embodiment also satisfies the condition (1). Further, the third embodiment also satisfies the above-mentioned condition (2).

Although not shown in figure, the depth curves of beam spot of the third embodiment are similar to those of the first and second embodiments. Thus, it is very satisfactory, and, a 'range (allowance of focal depth) through which change in spot diameter with respect to defocus amount of beam spot is small' is wide, and a stable, small-diameter, high-quality beam spot can be achieved, also in the third embodiment.

The scanning and imaging lens in each of the above-described first, second and third embodiments is a scanning and imaging lens condensing a light flux deflected by the deflector 4 onto the surface 7 to be scanned as a beam spot, and consists of the plurality of lenses L1 and L2. Further, in main scanning cross section, the lens L1 on the side of deflector has a positive power and has at least one surface having a non-arc shape, and the lens L2 on the side of surface to be scanned has the first surface having a convex shape and at least one surface having a non-arc shape. Further, the scanning and imaging lens has at least two special toroidal surfaces in each of which a curvature in sub-scanning cross section varies in main scanning direction.

In the scanning and imaging lens in the third embodiment, 'both the lens L1 on the side of deflector and lens L2 on the side of surface to be scanned have meniscus shapes in main scanning cross section, and be disposed so that the convex surfaces thereof are contiguous to one another'. Also the scanning and imaging lens in the third embodiment has the above-described 'lateral magnification βo in sub-scanning direction in the light path from the origin of deflection by the deflector to the surface to be scanned when the chief ray of the deflected light flux passes through the position at which the image height H is 0' being '0.77' and satisfies the above-mentioned condition (1), and, also, satisfies the above-mentioned condition (2), same as in the case of the scanning and imaging lens in each of the first and second embodiments.

Further, in the scanning and imaging lens in each of the first, second and third embodiments, 'at least one surface (fourth surface S4 in each embodiment) of the special toroidal surfaces' has a non-arc shape in main scanning cross section, and, also, a non-arc shape in sub-scanning cross section, wherein the non-arc shape in sub-scanning cross section varies according to a coordinate Y in main scanning direction, and the non-arc shape in sub-scanning cross section in each coordinate Y is determined so as to correct wavefront aberration on the surface to be scanned'. Further, the scanning and imaging lens consists of the two single lenses L1 and L2 disposed from the side of the deflector to the side of the surface to be scanned.

Further, the value of the parameter X4/X3 in the above-mentioned condition (5) is '0.23' in the first embodiment, '0.15' in each of the second and third embodiments, and, thus, each of the first, second and third embodiments satisfies the condition (5).

Further, in the scanning and imaging lens in each of the first, second and third embodiments, each of the lenses L1 and L2 has in sub-scanning cross section a 'meniscus shape such that the side of deflector is concave and the side of surface to be scanned is convex' on the optical axis and in the proximity thereof.

The optical scanning device in the third embodiment is an 'optical scanning device deflecting a light flux from the light source 1 by the deflector 4, condensing the deflected light flux onto the surface 7 to be scanned as a beam spot by the scanning and imaging lens L1 and L2, and, thus, scanning the surface 7 to be scanned by the beam spot'. The deflector 4 has the deflection reflective surface, the light flux from the light source 1 forms on or in the proximity of the deflection reflective surface a 'line image long in main scanning direction' by a 'line-image forming optical system' 3. The semiconductor laser is used as the light source 1. A light flux emitted by the light source 1 is transformed into a 'substantially parallel light flux' by the coupling lens 2.

The value of the parameter X3/L in the above-mentioned condition (6) is '0.18' in the first embodiment, '0.25' in the second embodiment, and '0.17 in the third embodiment. Accordingly, each of the first, second and third embodiments satisfies the condition (6).

Making reference to FIG. 6, an embodiment of an image forming apparatus according to the present invention will now be described.

This image forming apparatus is a laser printer.

The laser printer 100 has a 'cylindrical photoconductive photosensitive body' as an image carrying body 111. Around the image carrying body 111, a charging roller 112 as a charging unit, a developing unit 113, a transfer roller 114 and a cleaning unit 115 are arranged. It is possible to use a 'corona charger' as the charging unit. Further, an optical scanning device 117 is provided, which performs 'exposure by optical writing using a laser beam LB', between the charging roller 112 and developing unit 113.

The optical scanning device 117 is such as the above-mentioned first, second or third embodiment.

Figure 6:
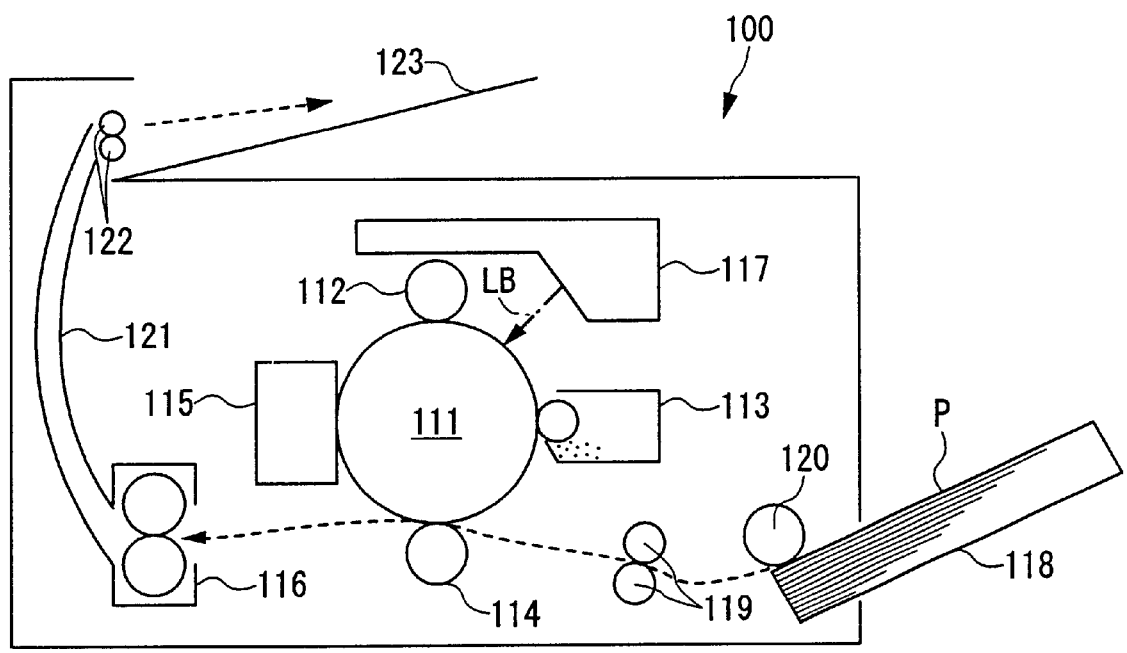
FIG. 6 shows an embodiment of an image forming apparatus according to the present invention.

Further, as shown in FIG. 6, a fixing unit 116, a cassette 118, a pair of registration rollers 119, a paper feeding roller 120, a conveyance path 121, a pair of paper ejecting rollers 122, and a tray 123 are provided. In the tray 123, transfer paper P as recording media is contained.

When a printed image is formed, the image carrying body 111 which is the photoconductive photosensitive body is rotated at a uniform velocity clockwise, a surface thereof is charged uniformly by the charging roller 112, and an electrostatic latent image is formed thereon by exposure through optical writing using the laser beam LB performed by the optical scanning device 117. The thus-formed electrostatic latent image is a so-called 'negative latent image' and in which an image portion is exposed.

The electrostatic latent image is developed by the developing unit 113 so that a toner image (positive image) is formed on the image carrying body 111.

The cassette 118 containing the transfer paper P is detachable from a body of the laser printer 100, and, in a condition in which the cassette 118 is attached to the body as shown in the figure, a top sheet of the transfer paper contained thereby is fed by the paper feeding roller 120. The thus-fed transfer-paper sheet is taken by the pair of the registration rollers 119 at the front end thereof. The pair of registration rollers 119 feed the transfer-paper sheet to the transfer roller 114 at a time at which the toner image on the image carrying body 111 moves to the transfer roller 114 due to rotation of the carrying body 111. The thus-fed transfer-paper sheet P is laid on the toner image at the transfer roller 114 and, by a function of the transfer roller 114, the toner image is electrostatically transferred onto the transfer-paper sheet. The transfer-paper sheet P having the toner image transferred thereonto has the toner image fixed thereonto by the fixing unit 116, then, passes through the conveyance path 121, and is ejected onto the tray 123 by the pair of paper ejecting rollers 122. After the toner image is transferred to the transfer-paper sheet, the surface of the image carrying body 111 is cleaned by the cleaning unit 115, and, thus, residual toner, paper powder and so forth are removed therefrom.

By employing such a device as the optical scanning device using the scanning and imaging lens in the first, second or third embodiment shown in FIG. 1 or 7 as the optical scanning device 117 of the laser printer, it is possible to perform image formation satisfactorily.

Thus, the image forming apparatus shown in FIG. 6 is an apparatus in which an electrostatic latent image is formed on the latent-image carrying body 111 by optical scanning, the thus-formed electrostatic latent image is developed so as to be visualized, and, thereby, a desired recorded (printed) image is obtained. In the image forming apparatus, as the optical scanning device 117 for performing the optical scanning of the latent-image carrying body 111, any of the above-mentioned optical scanning devices in the first, second and third embodiments is used. The image forming apparatus is such that the photoconductive photosensitive body is used as the latent-image carrying body 111, an electrostatic latent image is formed thereon through uniform charging and optical scanning thereof, the thus-formed electrostatic latent image is visualized as a toner image, the toner image is transferred and fixed onto the sheet-like recording medium P.

Thus, as described above, according to the present invention, novel scanning and imaging lens, optical scanning device and image forming apparatus can be achieved.

A scanning and imaging lens according to the present invention can achieve a beam spot in high-quality, having a small diameter, and having a high-stability spot diameter. An optical scanning device employs the above-mentioned scanning and imaging lens, and, thereby, can perform satisfactory writing using a beam spot in high-quality, having a small diameter, and having a high-stability spot diameter, and can perform high-density writing. Further, an image forming apparatus according to the present invention can form very high-quality images through optical writing by the above-mentioned optical scanning device.

The present invention is not limited to the above-described embodiments, and variations and modifications may be made without departing from the scope of the present invention.

The present application is based on Japanese priority applications Nos. 11-246805 and 11-373276, filed on Aug. 31, 1999 and Dec. 28, 1999, respectively, the entire contents of which are hereby incorporated by reference.

What is claimed is:

1. A scanning and imaging lens condensing a light flux deflected by a deflector onto a surface to be scanned as a beam spot, comprising a plurality of lenses, wherein:

a shape in main scanning cross section of each of both surfaces of a lens on a side of deflector has a convex shape, and a shape in main scanning cross section of at least one surface of said lens on the side of deflector is a non-arc shape;

a shape in main scanning cross section of a first surface of a lens on a side of surface to be scanned has a convex shape, and a shape in main scanning cross section of at least one surface of said lens on the side of surface to be scanned is a non-arc shape;

said scanning and imaging lens has at least two special toroidal surfaces in each of which a curvature in sub-scanning cross section varies in main scanning direction; and each of said at least two special toroidal surfaces have no rotational symmetrical axis.

2. The scanning and imaging lens as claimed in claim 1, wherein a lateral magnification βo in sub-scanning direction in a light path from an origin of deflection by the deflector to the surface to be scanned in an image height of 0 satisfies the following condition:

$$0.5<|\beta o|<1.5 \tag{1}$$

3. The scanning and imaging lens as claimed in claim 1, wherein a lateral magnification βo in an image height of 0 and a lateral magnification βh in an arbitrary image height in sub-scanning direction in a light path from an origin of deflection by the deflector to the surface to be scanned satisfy the following condition:

$$0.9<|\beta h/\beta o|<1.1 \tag{2}$$

4. The scanning and imaging lens as claimed in claim 1, wherein at least one surface of said special toroidal surfaces has a non-arc shape in main scanning cross section, and, also, a non-arc shape in sub-scanning cross section, and wherein said non-arc shape in sub-scanning cross section varies according to a coordinate Y in main scanning direction, and the non-arc shape in sub-scanning cross section in each coordinate Y is determined so as to correct wavefront aberration on the surface to be scanned.

5. The scanning and imaging lens as claimed in claim 1, wherein at least one surface of said special toroidal surfaces has a curvature in sub-scanning cross section varying asymmetrically with respect to an optical axis in main scanning direction.

6. The scanning and imaging lens as claimed in claim 1, wherein said scanning and imaging lens is of a configuration of two single lenses L1 and L2 disposed from the side of deflector to the side of surface to be scanned.

7. The scanning and imaging lens as claimed in claim 6, wherein each of said lenses L1 and L2 has a meniscus shape in sub-scanning cross section on an optical axis and in the proximity thereof such that the side of deflector is concave and the side of surface to be scanned is convex.

8. The scanning and imaging lens as claimed in claim 6, wherein:

each of said lenses L1 and L2 has a positive power in main scanning cross section; and a radius Rm2 of curvature of a second surface of said lens L1 on optical axis in main scanning cross section and a radius Rm3 of curvature of a first surface of said lens L2 on optical axis in main scanning cross section satisfy the following condition:

$$0.1 < |Rm2/Rm3| < 0.5 \quad (3).$$

9. The scanning and imaging lens as claimed in claim 6, wherein a radius Rs2 of curvature of a second surface of said lens L1 on optical axis in sub-scanning cross section and a radius Rs4 of curvature of a second surface of said lens L2 on optical axis in sub-scanning cross section satisfy the following condition:

$$0.05 < |Rs4/Rs2| < 0.5 \quad (4).$$

10. The scanning and imaging lens as claimed in claim 6, wherein:
   said scanning and imaging lens has at least two special toroidal surfaces in each of which a curvature in sub-scanning cross section varies asymmetrically with respect to the optical axis in main scanning direction; and
   each of said lenses L1 and L2 has at least one of said special toroidal surfaces.

11. An optical scanning device deflecting a light flux from a light source by a deflector, condensing the deflected light flux onto a surface to be scanned by a scanning and imaging lens and performing optical scanning of said surface to be scanned, wherein said scanning and imaging lens comprises the scanning and imaging lens claimed in claim 1.

12. The optical scanning device as claimed in claim 11, wherein:
   said deflector has a deflection reflective surface; and
   the light flux from said light source forms a line image long in main scanning direction on said deflection reflective surface or in the proximity thereof by a line-image forming optical system.

13. The optical scanning device as claimed in claim 11, wherein said light source comprises a semiconductor laser, and the light flux emitted from said light source is transformed into a substantially parallel light flux by a coupling lens.

14. The optical scanning device as claimed in claim 11, wherein a spot diameter according to LSF (Line Spread Function) of $1/e^2$ intensity of a beam spot condensed onto said surface to be scanned is set to equal to or smaller than 50 µm in each of main scanning direction and sub-scanning direction.

15. An image forming apparatus forming an electrostatic latent image onto a latent-image carrying body through optical scanning, visualizing the electrostatic latent image and obtaining a desired recorded image, wherein an optical scanning device performing the optical scanning of said latent-image carrying body comprises the optical scanning device claimed in claim 11.

16. The image forming apparatus as claimed in claim 15, wherein:
   said latent-image carrying body comprises a photoconductive photosensitive body;
   the electrostatic latent image is formed on said latent-image carrying body through uniform charging and optical scanning thereof; and
   the formed electrostatic latent image is visualized as a toner image.

17. A scanning and imaging lens condensing a light flux deflected by a deflector onto a surface to be scanned as a beam spot, comprising a plurality of lenses, wherein:

a lens on a side of deflector has a positive power in main scanning cross section, and a shape in main scanning cross section of at least one surface of said lens on the side of deflector is a non-arc shape;

a shape in main scanning cross section of a second surface of a lens on a side of surface to be scanned has a convex shape, and a shape in main scanning cross section of at least one surface of said lens on the side of surface to be scanned is a non-arc shape;

said scanning and imaging lens has at least two special toroidal surfaces in each of which a curvature in sub-scanning cross section varies in main scanning direction; and each of said at least two special toroidal surfaces have no rotational symmetrical axis.

18. The scanning and imaging lens as claimed in claim 17, wherein each of said lens on the side of deflector and said lens on the side of surface to be scanned has a meniscus shape in main scanning cross section, and they are disposed so that convex surfaces thereof are contiguous with one another.

19. The scanning and imaging lens as claimed in claim 17, wherein a lateral magnification βo in sub-scanning direction in a light path from an origin of deflection by the deflector to the surface to be scanned in an image height is 0 satisfies the following condition:

$$0.5 < |\beta o| < 1.5 \quad (1).$$

20. The scanning and imaging lens as claimed in claim 17, wherein a lateral magnification βo in an image height of 0 and a lateral magnification βh in an arbitrary image height in sub-scanning direction in a light path from an origin of deflection by the deflector to the surface to be scanned satisfy the following condition:

$$0.9 < |\beta h/\beta o| < 1.1 \quad (2).$$

21. The scanning and imaging lens as claimed in claim 17, wherein:
   at least one surface of said special toroidal surfaces has a non-arc shape in main scanning cross section, and, also, a non-arc shape in sub-scanning cross section; and
   the non-arc shape in sub-scanning cross section varies according to a coordinate Y in main scanning direction, and the non-arc shape in sub-scanning cross section in each coordinate Y is determined so as to correct wavefront aberration on the surface to be scanned.

22. The scanning and imaging lens as claimed in claim 17, wherein said scanning and imaging lens comprises two single lenses L1 and L2 disposed from the side of deflector to the side of surface to be scanned.

23. The scanning and imaging lens as claimed in claim 22, wherein, when X3 denotes a space between said lens L1 on the side of deflector and said lens L2 on the side of surface to be scanned, and X4 denotes a thickness of said lens L2 on the side of surface to be scanned, these satisfy the following conditon:

$$0.10 < X4/X3 < 0.30 \quad (5).$$

24. The scanning and imaging lens as claimed in claim 22, wherein each of said lenses L1 and L2 has a meniscus shape in sub-scanning cross section on an optical axis and in the proximity thereof such that the side of deflector is concave and the side of surface to be scanned is convex.

25. An optical scanning device deflecting a light flux from a light source by a deflector, condensing the deflected light flux onto a surface to be scanned by a scanning and imaging lens and performing optical scanning of said surface to be scanned, wherein said scanning and imaging lens comprises the scanning and imaging lens claimed in claim 17.

26. The optical scanning device as claimed in claim 25, wherein:

said deflector has a deflection reflective surface; and the light flux from said light source forms a line image long in main scanning direction on said deflection reflective surface or in the proximity thereof by a line-image forming optical system.

27. The optical scanning device as claimed in claim 25, wherein said light source comprises a semiconductor laser, and the light flux emitted from said light source is transformed into a substantially parallel light flux by a coupling lens.

28. The optical scanning device as claimed in claim 25, wherein a spot diameter according to LSF (Line Spread Function) of $1/e^2$ intensity of a beam spot condensed onto the surface to be scanned is set to equal to or smaller than 50 µm in each of main scanning direction and sub-scanning direction.

29. The optical scanning device as claimed in claim 25, wherein:

said scanning and imaging lens is of a configuration of two single lenses L1 and L2 disposed from the side of deflector to the side of surface to be scanned; and when X3 denotes a space between said lens L1 on the side of deflector and said lens L2 on the side of surface to be scanned, and L denotes a distance on a chief ray of deflected light flux passing through a position at which an image height is 0 between an origin of deflection by the deflector and the surface to be scanned, these satisfy the following conditon:

$$0.15 < X3/L < 0.30 \tag{6}.$$

30. An image forming apparatus forming an electrostatic latent image onto a latent-image carrying body through optical scanning, visualizing the electrostatic latent image and obtaining a desired recorded image, wherein an optical scanning device performing the optical scanning of said latent-image carrying body comprises the optical scanning device claimed in claim 25.

31. The image forming apparatus as claimed in claim 30, wherein:

said latent-image carrying body comprises a photoconductive photosensitive body;

the electrostatic latent image is formed on said latent-image carrying body through uniform charging and optical scanning thereof; and the formed electrostatic latent image is visualized as a toner image.

\* \* \* \* \*